United States Patent [19]

Carr

[11] Patent Number: 5,053,122
[45] Date of Patent: Oct. 1, 1991

[54] OIL FILTRATION AND EXHAUST APPARATUS

[75] Inventor: Syd K. Carr, Nampa, Id.

[73] Assignee: Micron Technology, Inc., Boise, Id.

[21] Appl. No.: 581,050

[22] Filed: Sep. 13, 1990

[51] Int. Cl.$^5$ ............................................. B01D 19/00
[52] U.S. Cl. ....................................... 210/95; 210/168; 210/188; 210/317; 210/335; 210/416.5; 210/489; 210/496; 55/186; 55/196; 55/518; 55/526; 418/2; 418/85; 418/88; 418/89; 418/DIG. 1
[58] Field of Search ............... 210/94, 95, 168, 180, 210/182, 188, 295, 296, 314, 335, 337, 416.1, 416.5, 472, 489, 195.1, 317, 496; 418/2, 85, 88, 89, DIG. 1; 55/159, 183, 185, 186, 196, 518, 526

[56] References Cited

U.S. PATENT DOCUMENTS

| | | | |
|---|---|---|---|
| 2,227,441 | 1/1941 | Coleman | 418/89 |
| 3,327,936 | 6/1967 | Rollinger | 418/85 |
| 4,228,004 | 10/1980 | Foster | 210/791 |
| 4,475,876 | 10/1984 | Olen | 418/85 |
| 4,761,166 | 8/1988 | Kitchener et al. | 55/385.1 |

FOREIGN PATENT DOCUMENTS

| | | | |
|---|---|---|---|
| 628867 | 10/1961 | Canada | 210/94 |
| 1041024 | 10/1978 | Canada | 55/186 |
| 48109 | 9/1981 | Fed. Rep. of Germany | 418/DIG. 1 |
| 142989 | 11/1980 | Japan | 418/DIG. 1 |
| 8388 | 1/1989 | Japan | 418/85 |

Primary Examiner—W. Gary Jones
Assistant Examiner—Matthew O. Savage
Attorney, Agent, or Firm—Robert A. de Groot; Stephen A. Gratton

[57] ABSTRACT

An oil filtration and exhaust apparatus for filtering particulates and gases from the recirculating oil of a vacuum pump which is adapted to remove gases from a process enclosure. The oil filtration and exhaust apparatus removes particulates and gases from the recirculating oil by means of particulate filters and a gas scrubbing filter. Additionally, the exhaust gases are demisted prior to exhaust to an exhaust header. The apparatus is particularly suited to semiconductor manufacturing processes.

8 Claims, 3 Drawing Sheets

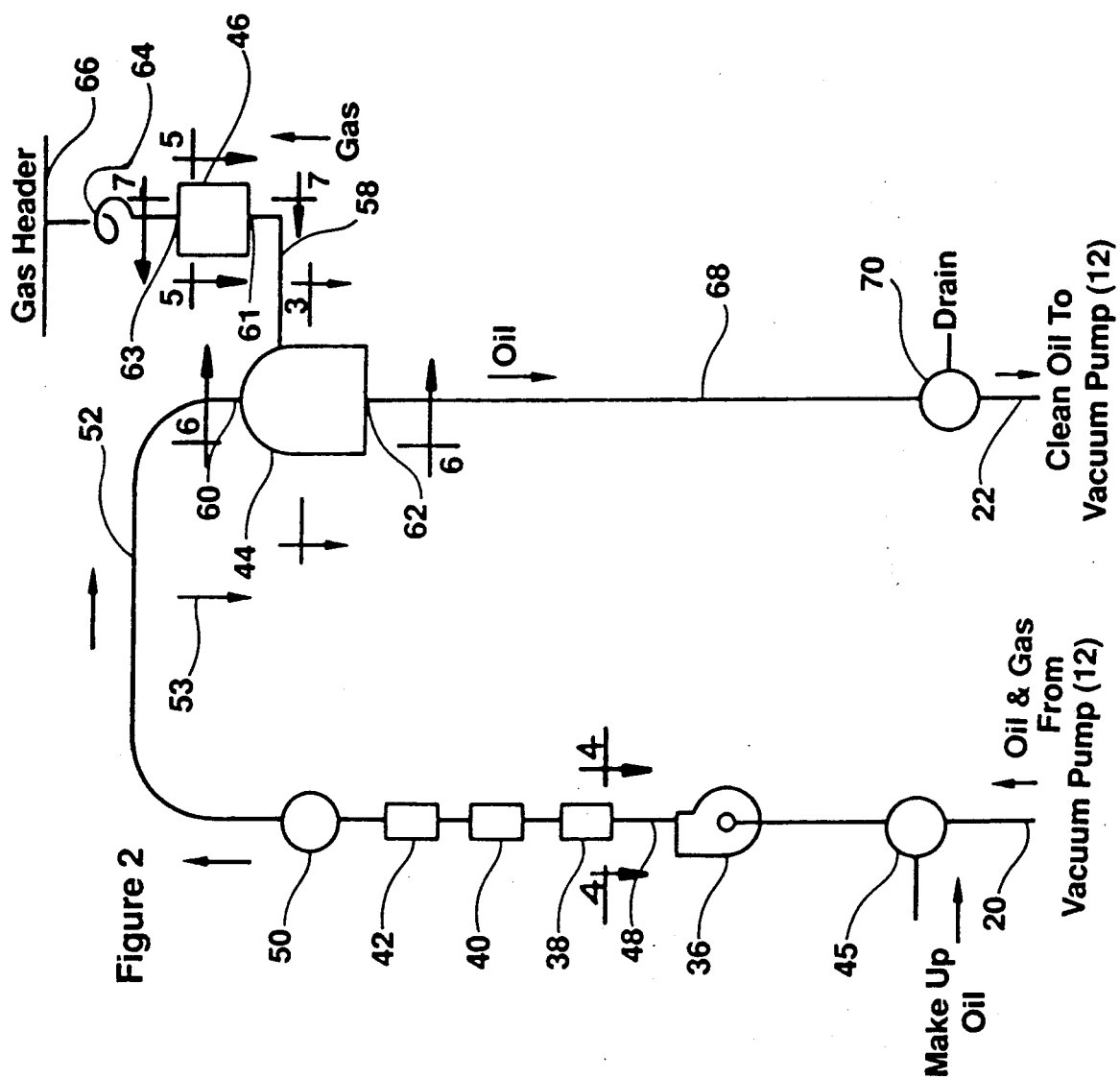

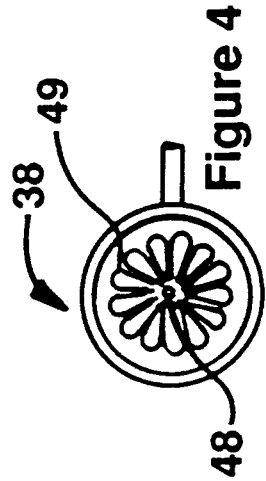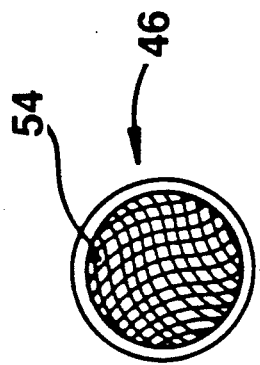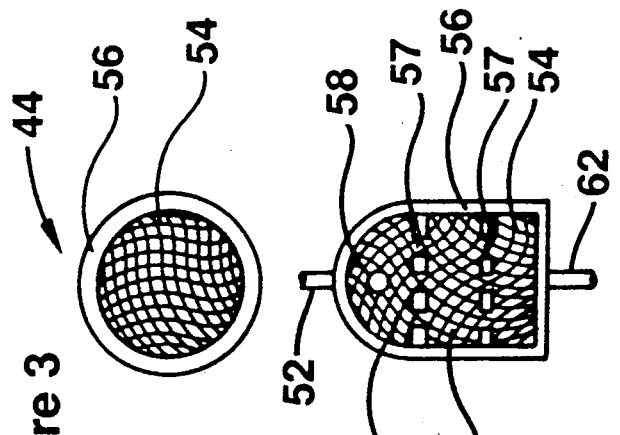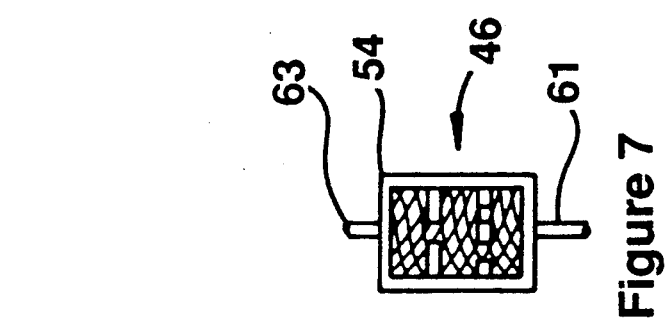

OIL FILTRATION AND EXHAUST APPARATUS

FIELD OF THE INVENTION

This invention relates generally to oil filtration and exhaust apparatus and, more particularly, to an oil filtration and exhaust apparatus particularly suited for use in semiconductor manufacturing for removing particulates and gas from the recirculating oil of a vacuum pump.

BACKGROUND OF THE INVENTION

In semiconductor fabrication processes, miniature electronic devices are formed on semiconductor wafers. In general, various materials which are either conductive, insulating, or semiconducting are patterned, doped, or deposited in layers to form the integrated circuits. The completed semiconductor circuit device is usually referred to as a semiconductor.

Because of the extreme miniaturization of the electrical components in an integrated circuit, particulate contamination during any semiconductor processing step or the manufacturing atmosphere in general adversely affects the proper performance of the finished product. Additionally, these various processes produce chemicals and byproducts which must be effectively disposed of or recycled.

One such semiconductor manufacturing process is chemical etching. In general, an etching process may be utilized to form patterns and contact vias on a semiconductor wafer. The etching process is typically accomplished in a hood or in an enclosed reaction space. A vacuum is applied to the hood or space to remove and filter airborne contaminants and gaseous byproducts from the reaction space. Among the gaseous byproducts are chlorine, silicon-tetrachloride, boron, trichloride, and other inert gases.

Typically, a vacuum pump is utilized to remove air from the reaction space. The vacuum pump includes a blower and recirculated vacuum oil which is mixed with the air in the pump to remove reaction gases or particulates entrained in the air. These contaminants must then be removed from the recirculated oil and disposed of or, in the case of gases, exhausted. The oil filtration and exhaust apparatus of the present invention is directed to such a filtration system for removing and disposing of contaminants formed during semiconductor manufacturing processes.

A first consideration in such filtration systems is that it is important that essentially all of the gaseous byproducts and particulates be removed from the recirculating oil. Additionally, the exhausted gases must be effectively disposed of. This is typically accomplished by venting the exhausted gases into an exhaust conduit which directs the gases to a furnace for burning.

A problem with such exhaust gas is that it is often carried into the exhaust conduits with entrained solid and vapor material. This material builds up as a solid mass on the walls of the exhaust conduits and eventually completely plugs an exhaust conduit. During normal operation of such a filtration system in semiconductor manufacture, a 10" (I.D.) exhaust conduit, for example, may be reduced by solid build-up to a 6" (I.D.) conduit within a matter of weeks. This renders the exhaust conduit as inoperable and necessitates replacement of the conduit. This is an expensive and time-consuming process.

There is a need, then, in semiconductor manufacturing for an oil filtration and exhaust apparatus which effectively removes particulates and entrained gases from the recirculating oil of a vacuum pump. In addition, there is a need for a system in which particulates and vapor are removed from exhausted gases prior to disposal in an exhaust conduit.

SUMMARY OF THE INVENTION

In accordance with the present invention, an oil filtration and exhaust apparatus for use with recirculating oil on a vacuum pump is provided. The apparatus of the invention, simply stated, is a filtration loop in which entrained gas and particulates are removed from the recirculating oil of a vacuum pump and entrained particles and vapor are removed from the exhausted ga prior to disposal.

The oil filtration and exhaust apparatus in general comprises:

pump means for pumping recirculating oil from a vacuum pump through a closed conduit loop;

a plurality of particulate filter means for removing particulates from the recirculating oil;

gas scrubbing means including a canister having a filter medium, such as stainless steel wool, an inlet for receiving the recirculating oil, and an outlet for exhausting gas flow in a different direction; and demister means for removing vapor entrained within the exhausted gas prior to venting into an exhaust conduit.

With the oil filtration and exhaust apparatus of the invention, particulate and gaseous contaminants are effectively removed from the recirculating oil of a vacuum pump. Additionally, particulates and entrained vapor are effectively removed from the gases prior to disposal through an exhaust conduit. This prevents the build up of material within the exhaust conduit.

Other objects, advantages, and capabilities of the present invention will become more apparent as the description proceeds.

BRIEF DESCRIPTION OF THE DRAWINGS

FIG. 2 is a schematic drawing of an oil filtration and exhaust apparatus constructed in accordance with the invention;

FIG. 3 is a cross-section taken along section line 3—3 of FIG. 2;

FIG. 4 is a cross-section of the paper filter taken along section liens 4—4 of FIG. 2;

FIG. 5 is a cross-section of the demister taken along section lines 5—5 of FIG. 2;

FIG. 6 is a cross-section of the gas scrubbing filter taken along section lines 6—6 of FIG. 2; and FIG. 7 is a cross-section of the gas scrubbing filter taken along section liens 7—7 of FIG. 2.

DETAILED DESCRIPTION OF THE INVENTION

Figure 1:
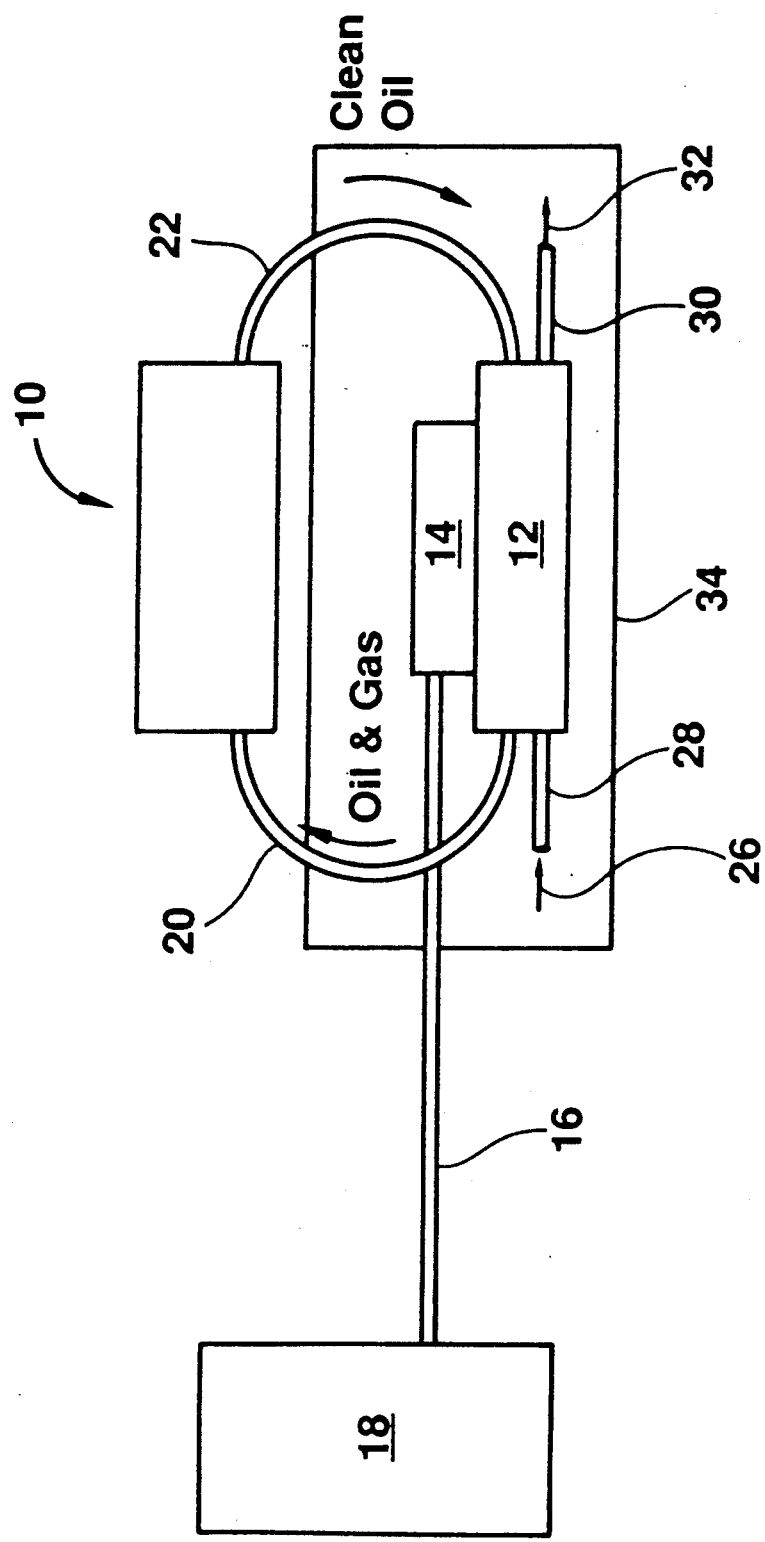
FIG. 1 is a schematic drawing of a vacuum pump with recirculating oil filtered and exhausted in accordance with the invention.

Referring now to FIGS. 1 and 2, an oil filtration and exhaust apparatus constructed in accordance with the invention is shown and generally designated as 10. The apparatus is adapted for use on the recirculated oil of a vacuum pump.

In FIG. 1, the vacuum pump 12 is shown. The vacuum pump 12 includes a conventional blower 14 which draws air through a conduit 16 from an enclosed or hooded reaction chamber 18. In general, the reaction chamber 18 can be any area from which air must be removed, cleaned, and exhausted. As an example, the reaction chamber 18 may be a chamber wherein semiconductor devices are processed or etched.

Any reaction gases or particulates entrained in the air conducted through conduit 16 are mixed with the recirculating oil within the vacuum pump 18. This recirculating oil is then circulated through the vacuum pump 12 and is thereafter directed to the oil filtration and exhaust apparatus 10 of the invention through conduit 20. After filtering, clean oil is returned to the vacuum pump via a return conduit 22.

Ballast, typically in the form of an inert gas, may be added to the vacuum pump 12 in the direction of arrow 26 through inlet means 28. A vacuum pump purge, or exhaust means 30, removes gases in the direction of arrow 32 from the interior of the vacuum pump 12. An enclosure 34 may surround the vacuum pump 12 in a manner so as to retain a majority of the latent heat within the enclosure. Moreover, the entire assembly may be mounted on a wheeled cart (not shown) for easy transport.

A vacuum pump 12 suitable for this application is a two-stage pump manufactured by Edwards Co., Model No. E2M40. The inert gas utilized herein is preferably nitrogen which serves a dual purpose in this environment. First, the gas facilitates removal of the particulate materials removed from the enclosed space and, second, excess nitrogen introduced into the vacuum pump exhausts through the vacuum pump means 30, carrying with it any undesired reaction gases not entrained in the oil. It is preferable, however, to exhaust most gases through the oil filtration and exhaust apparatus 10 of the invention.

Referring now to FIG. 2, the oil filtration and exhaust apparatus 10 constructed in accordance with the invention is shown. The oil filtration and exhaust apparatus 10 generally stated comprises:

pump means in the form of a recirculating pump 36 for pumping recirculating oil from the vacuum pump 12 through a closed conduit loop;

a plurality of particulate filter means in the form of particulate filters 38,40,42 for removing particulates from the recirculating oil;

gas scrubbing means including a gas scrubbing filter 44 for receiving recirculating oil in a first direction and exhausting cleaned gas in a second direction; and demister means in the form of a demister 46 for removing vapor entrained within the exhausted gas.

With reference to FIG. 2, recirculating oil having entrained gases and particulate material therein is pumped by the recirculating pump 36 from the vacuum pump 12 of the system. A three-way valve 45 is situated between the recirculating pump 36 and vacuum pump 12 and may be utilized to add make-up recirculating oil to the system.

Upon exiting, the recirculating pump 36 oil is directed via a suitable conduit 48 through the filter elements 38,40, 42. The filter media contained within filter elements 38, 40,42, must be sufficient to remove suspended particulate contaminants from the recirculated oil at least as small as about 0.5-1 micron in diameter. Applicant has found conventional pleated-paper filters 49 (FIG. 4) such as Filterdyne Model No. 511-581, function adequately for this purpose. It is to be understood that while the schematic representation of the filtration device of FIG. 2 illustrates three filter elements 38,40,42, any reasonable number of filter elements necessary to adequately filter particulate contamination may be used.

The particulate filtered oil is then directed through another valve 50 and through a conduit 52 into the gas scrubbing filter 44 of the invention. Conduit 52 may be of a flexible and transparent material such as clear plastic tubing in order to provide visual access to the recirculating oil.

The gas scrubbing filter 44 in general functions to separate gases and vapor from the oil. Additionally, gas scrubbing filter 44 functions to further remove particulate material entrained within the recirculating oil and exhausted gas. These functions are accomplished by directing fluid oil flow in a first direction arrow 53 through the gas scrubbing filter 44 and exhausting gas in a different direction arrow 55.

As shown by the cross-section of FIG. 3 and 6, the gas scrubbing filter 44 includes a plurality of stainless steel wool filter elements 54 mounted within a canister 56. Additionally, as shown in FIG. 6, the inside diameter of the canister 56 is larger than the inside diameter of the conduit 52 into the gas scrubbing filter 44. Moreover, more than one steel wool filter elements 54 (i.e., three) may be mounted within the canister 56 and retained by suitable means such as flat, generally circular, filter plates 57 (FIG. 6) having a plurality of openings.

Exhaust means in the form of a gas exhaust conduit 58 is provided for the gas scrubbing filter 44. The gas exhaust conduit 58 is located between an oil inlet portion 60 and an oil outlet portion 62 of the gas scrubbing filter 44. This arrangement promotes a gas scrubbing effect in which fluid flow of recirculating oil is directed in a first direction (arrow 53) and exhaust gas is removed in a different direction (arrow 55). This gas scrubbing effect effectively removes gases entrained within the fluid recirculating oil and is promoted by the arrangement of steel wool filters 54, the size of the canister 56, and the location of the gas exhaust conduit 58 with respect to the inlet 60 and outlet 62 of the canister 56.

The exhausted gas is further directed by the gas exhaust conduit 58 into a demister 46 which functions to further remove any vapor entrained within the exhausted gases. The demister 46 (FIGS. 5 and 7) may be similar in construction to the gas scrubbing filter 44 formed of a canister having a stainless steel wool filter medium. The demister includes a straight through inlet 61 and outlet 63 for the exhausted gases.

The cleaned and demisted exhaust gas is then directed through another exhaust conduit 64 into a main gas header 66 for disposal. As illustrated schematically exhaust gas conduit 64 may be of a flexible material such as plastic tubing or conduit and may include suitable removable couplings for attachment to the main gas header 66.

With the oil filtration and exhaust gas apparatus of the invention, particulate material is effectively removed from the recirculating oil of the vacuum pump. Additionally, essentially all vapor and entrained particulates are removed from the gases exhausted into the main gas header 66. The applicant has found that this prevents accumulation or build-up of material within the gas header. These gases may then be directed to a burn box (not shown) or the like for disposal.

A return conduit 68 from the gas scrubbing filter outlet 62 directs clean recirculating oil flow back into the vacuum pump 12. A three-way drain valve 70 may be provided within the conduit 68. Valves 45 and 70 may then be used to add or drain recirculating oil from the system.

Applicant has found that the apparatus 10 of the invention functions optimally at about 10-12 psi differential between the upstream and downstream sides of the filter elements 38,40,42. When the pressure differential reaches 45-50 psi, this is an indication that the filter media are clogged and need to be changed.

Enclosure 34 (FIG. 1) retains latent heat generated by the vacuum pump 12 within the enclosure 34, thereby maintaining the recirculating oil at an elevated temperature, which should be at least 40° C. When cooled, substantially below 40° C., the particulates in the recirculating oil tend to crystallize, resulting in substantial plugging of the filters 38,40,42. In certain instances, it may thus be necessary to heat the recirculating oil to maintain the proper temperature.

Thus, the invention provides an apparatus for effectively removing particulates and gases from the recirculating oil of a vacuum pump and for removing vapor and particulates from the exhausting gases. While the apparatus is particularly suited to semiconductor manufacture, it may also be suitable to other processes wherein particulates and gases must be removed from an oil and vapor and particulates removed from the exhausted gases.

While the apparatus of the invention has been described with reference to a preferred embodiment, as will be apparent to those skilled in the art, certain changes and modifications can be made without departing from the scope of the invention as defined by the following claims.

What is claimed is:

1. Apparatus for removing and filtering gases from an enclosure comprising:
   a. a vacuum pump with a blower adapted to remove process gases from the enclosure and having recirculating therein oil for mixing with the process gases so that the gases may be filtered and exhausted;
   b. a closed conduit loop connected to said vacuum pump;
   c. an oil pump having an inlet and an outlet connected within said conduit loop for pumping recirculating oil from the vacuum pump through said closed conduit loop, wherein the inlet of said oil pump is connected to said vacuum pump;
   d. a particulate filter in the conduit loop downstream of said oil pump outlet for removing particulates from the recirculating oil;
   e. a gas scrubbing filter in the conduit loop downstream of the particulate filter for separating gases entrained within the recirculating oil and including a filter medium, said gas scrubbing filter having an inlet for directing recirculating oil through the filter medium in a downward direction and an exhaust outlet attached to an upper portion of the gas scrubbing filter for removing gases from the recirculating oil in a upward direction and having a gas scrubbing filter outlet connected to sad vacuum pump for returning recirculating oil to said vacuum pump;
   f. a demister connected to said exhaust outlet of the gas scrubbing filter for removing vapor and particulates from the exhausted gases.

2. Apparatus as recited in claim 1 and further comprising:
   a make-up valve and a drain valve in the closed conduit loop for adding or removing recirculating oil attached adjacent the oil pump inlet and the gas scrubbing filter outlet, respectively.

3. Apparatus as recited in claim 2 and wherein:
   a portion of said closed conduit loop located between the particulate filter and the gas scrubbing filter is transparent for viewing the recirculating oil.

4. Apparatus as recited in claim 3 and wherein:
   said gas scrubbing filter comprises a canister having a plurality of stainless steel wool filters mounted therein.

5. Apparatus as recited in claim 4 and wherein:
   said demister comprises a canister having a stainless steel wool filter mounted therein.

6. Apparatus as recited in claim 5 and wherein:
   a heat retention enclosure surrounds said vacuum pump and blower for enclosing and retaining heat within the vacuum pump to maintain an elevated recirculating oil temperature.

7. In a vacuum pump, apparatus for removing particulates and gases entrained in recirculating oil of the vacuum pump and for removing particulates and vapor from the gases, comprising:
   a. pump means for pumping recirculating oil from the vacuum pump through a closed conduit loop having a pump means inlet conduit connected to the vacuum pump and a pump means outlet;
   b. a particulate filter in said closed conduit loop connected to the pump means outlet having a plurality of particulate filter elements capable of removing particulates from the oil having a diameter of about 0.5 micron;
   c. a gas scrubbing means in said closed conduit loop having a transparent inlet conduit connected to a particulate filter outlet conduit, said gas scrubbing means consisting of a canister and having a plurality of stainless steel wool filters formed such that liquid recirculating oil flows through the canister in a downward direction exiting via a canister outlet and exhaust gas is exhausted from the canister in an upward direction, said canister outlet being connected in said vacuum pump for returning recirculating oil to said vacuum pump;
   d. exhaust means connected to an upper portion of the gas scrubbing means for exhausting the scrubbed exhaust gas to an exhaust conduit;
   e. demister means connected to said exhaust conduit consisting of a demister canister containing a stainless steel wool filter for removing vapor and particulates entrained in the exhaust gas from the exhaust means;
   f. a drain valve connected within said closed conduit loop between the canister outlet and the vacuum pump; and
   g. a make-up valve connected within said closed conduit loop between said pump means inlet conduit and said vacuum pump for adding oil to the closed conduit loop.

8. In a vacuum pump having a blower and having recirculating oil therein for removing gas and particulate contaminants from air in an enclosure, an oil filtration and exhaust gas apparatus comprising:
   a. a closed conduit loop connected to said vacuum pump;
   b. oil pump means for pumping oil from the vacuum pump and circulate recirculating oil through said closed conduit loop, said oil pump having an inlet conduit connected to the vacuum pump and an outlet conduit;

c. a particulate filter, within said closed conduit loop having an inlet conduit connected to the oil pump outlet conduit and an outlet conduit, for removing particulates from the recirculating oil;

d. a gas scrubbing filter connected to the particulate filter outlet conduit, said gas scrubbing filter comprising: a transparent inlet conduit connected to the particulate filter outlet conduit, a canister having an inside diameter greater than the transparent canister inlet conduit, a plurality of stainless steel wool filters located inside said canister, a canister outlet connected to said vacuum pump for returning recirculating oil to said vacuum pump, and an exhaust gas conduit attached at an upper portion of the canister, whereby recirculating oil may be directed and filtered in a downward direction exiting the canister outlet and gas exhausted from the oil in an upward direction;

e. a demister comprising a canister having three stainless steel wool filters, connected to the exhaust gas conduit for removing particulate and vapor entrained within the exhausted gas; and f. make-up and drain valves means connected within the closed conduit loop for respectively adding or removing make-up oil, said make-up valve means being connected adjacent the oil pump inlet and said drain valve means being connected adjacent the gas scrubbing filter canister outlet.

* * * * *

UNITED STATES PATENT AND TRADEMARK OFFICE
CERTIFICATE OF CORRECTION

PATENT NO. : 5,053,122
DATED : Oct. 1, 1991
INVENTOR(S) : Syd K. Carr

It is certified that error appears in the above-identified patent and that said Letters Patent is hereby corrected as shown below:

On the cover page, the "Inventor" should read:
Syd K. Carr, Nampa, Id. --; Joseph C. Hanson, Boise, Id. --.

Signed and Sealed this

Twenty-third Day of March, 1993

Attest:

STEPHEN G. KUNIN

*Attesting Officer*    *Acting Commissioner of Patents and Trademarks*